United States Patent
Rodney

(10) Patent No.: US 11,030,880 B1
(45) Date of Patent: Jun. 8, 2021

(54) LOSS PREVENTION SYSTEM

(71) Applicant: Rolinston Rodney, Scarborough (CA)

(72) Inventor: Rolinston Rodney, Scarborough (CA)

( * ) Notice: Subject to any disclaimer, the term of this patent is extended or adjusted under 35 U.S.C. 154(b) by 0 days.

(21) Appl. No.: 16/559,379

(22) Filed: Sep. 3, 2019

(51) Int. Cl.
*G08B 21/24* (2006.01)
*G08B 13/24* (2006.01)
*G08B 21/18* (2006.01)
*H04W 4/02* (2018.01)

(52) U.S. Cl.
CPC ............. *G08B 21/24* (2013.01); *G08B 13/24* (2013.01); *G08B 21/182* (2013.01); *H04W 4/023* (2013.01)

(58) Field of Classification Search
CPC ...... G08B 21/24; G08B 13/24; G08B 21/182; H04W 4/023
See application file for complete search history.

(56) References Cited

U.S. PATENT DOCUMENTS

| | | | | |
|---|---|---|---|---|
| 9,961,523 | B1* | 5/2018 | Daoura | H04W 4/12 |
| 2014/0145847 | A1* | 5/2014 | Jenkins | G08B 13/2402 |
| | | | | 340/572.1 |
| 2015/0156567 | A1* | 6/2015 | Oliver | G08B 21/24 |
| | | | | 340/870.07 |
| 2017/0061525 | A1* | 3/2017 | McCoy | G06Q 30/0639 |
| 2018/0075721 | A1* | 3/2018 | Oliver | G08B 21/0227 |

* cited by examiner

*Primary Examiner* — Sisay Yacob
(74) *Attorney, Agent, or Firm* — Capehart Law Firm

(57) ABSTRACT

A system to protect precious articles comprising a beacon device coupled with the precious articled in wireless communication with a detection device coupled with a user. The system periodically estimates the distance between the beacon device and the detection device and triggers an alarm on the detection device when the distance exceeds a predetermined threshold.

16 Claims, 5 Drawing Sheets

LOSS PREVENTION SYSTEM

REFERENCE TO PENDING APPLICATIONS

This application does not claim the benefit of pending application.

BACKGROUND OF THE INVENTION

1. Field of the Invention

The present invention is generally related to a loss prevention system, a specifically, toward a loss prevention system that includes providing an notification when an article is beyond a specific distance threshold.

2. Description of the Related Art

There are several precious articles, such as mobile device, computer, camera, wallet, keys, important documents for example, that are carried on a daily basis and subject to loss either by theft or by being left behind by inadvertence.

For mobile devices, there exist applications that can be downloaded to communicate with an external device (such as the Tile device for example). The external device can be used to find the mobile device by making it ring. However, these devices will only effectively track the mobile device if the mobile device battery has some charge, furthermore, the system would not work if the mobile device is out of cellular or WWI range.

The Tile system and other similar systems can also be attached to precious articles and the application on the mobile phone can be used to find the precious article using a geolocation detection. Again, these systems only work if the mobile phone is actively working (e.g. enough charge in the battery and/or within cellular or WIFI range).

The existing systems also are used to locate a precious article when it is already lost or stolen.

There is a need for a system that notifies a user that a precious article is moving away from them, before it is lost or while the thieves are still in reach without requiring an active mobile phone (e.g. charge in the battery and/or cellular or WIFI connectivity).

SUMMARY OF THE INVENTION

This application discloses a system to protect from loss of one or more precious article owned by a user comprising a beacon device coupled with the precious articles, the beacon in short range wireless communication with a detection device coupled with the user, wherein the detection device periodically estimates the distance with the beacon device and triggers an alarm on the detection device when said distance exceeds a predetermined threshold.

The features of the invention which are believed to be novel are particularly pointed out in the specification. The present invention now will be described more fully hereinafter This invention may, however, be embodied in many different forms and should not be construed as limited to the embodiments set forth herein; rather, these embodiments are provided by way of illustration only and so that this disclosure will be thorough, complete and will fully convey the full scope of the invention to those skilled in the art.

BRIEF DESCRIPTION OF THE DRAWINGS

The figures which accompany the written portion of this specification illustrate embodiments and method(s) of use for the present invention constructed and operative according to the teachings of the present invention.

The various embodiments of the present invention will hereinafter be described in conjunction with the appended drawings, wherein like designations denote like elements.

DETAILED DESCRIPTION

Figure 1:
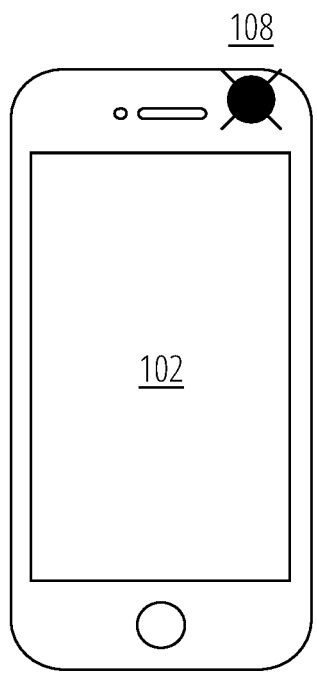
FIG. 1 illustrates one embodiment of the loss prevention system.
Figure 1:
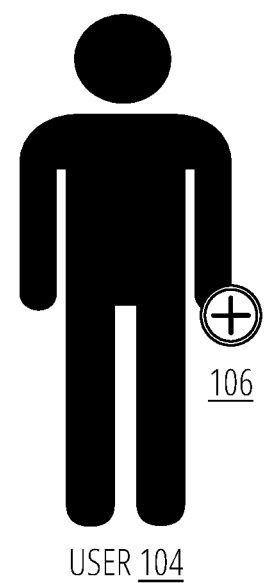

FIG. 1 depicts the elements of the system. A user 104 carries a detection device 106 which is in wireless communication with a beacon device 108 coupled to a precious article 102.

The precious article can be any article the user 104 does not want to lose, such as, a mobile device, computer, camera, wallet, purse, keys, important documents, briefcase, for example.

The beacon device 108 is a small device that can be attached to the precious article. The attachment can be done, for example, using strong double-sided tape.

The detection device 106 is a small device that can be carried by the user 104 either in a pocket, on a bracelet, a necklace, an armband, a chest strap, coupled to a belt, for example. Further, the detection device 106 may be attached to a second precious article. For example, a beacon device 108 may be attached to wallet and a detection device 106 may be attached to a user's keys.

The beacon device 108 and detection device 106 are communicating using a wireless protocol and paired at manufacture. If at least one of the device is turned off or the battery is changed, an automatic pairing protocol between the beacon device 108 and the detection device 106 is activated to pair the two device using the wireless pairing standard used of the system without requiring user intervention.

In another embodiment, an application on a smart phone or tablet is used to pair the two devices. Once the pairing is done, the application is no longer used for the communication between the detection device and the beacon device 108. In another embodiment, the application can be used to program the parameters of the system.

A detection device 106 can be paired with multiple beacon device 108 to give a user 104 the ability to protect multiple precious article 102.

Figure 2:
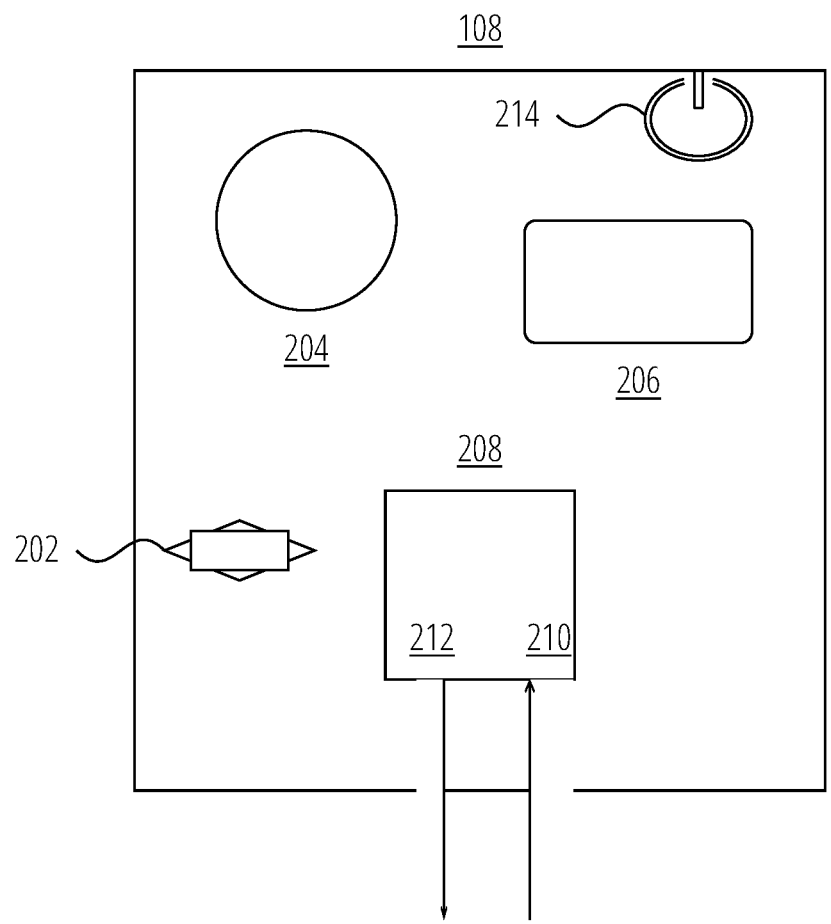
FIG. 2 illustrates one embodiment of the beacon device.

FIG. 2 illustrates one embodiment of the beacon device 108. The beacon device 108 is powered by a beacon battery 204 which can be replaceable or rechargeable. The beacon battery 204 can be of the type that can be charged using electrical, magnetic or solar charger as well known in the art. The beacon device 108 comprises a beacon wireless communication 208 module which comprises a beacon wireless receiver 210 and a beacon wireless transmitter 212. The beacon wireless communication 208 module can be of any type of short range wireless protocol known in the art, such as bluetooth, RFID for examples.

The beacon device 108 comprises a beacon processor 206 to process the signals received by the beacon wireless receiver 210 and to send signals via the beacon wireless transmitter 212.

The beacon device 108 may have a beacon on/off switch 214.

Optionally the beacon device 108 comprises a beacon alarm 202 to emit sound and/or visual notifications when it is triggered by the beacon processor 206.

Figure 3:
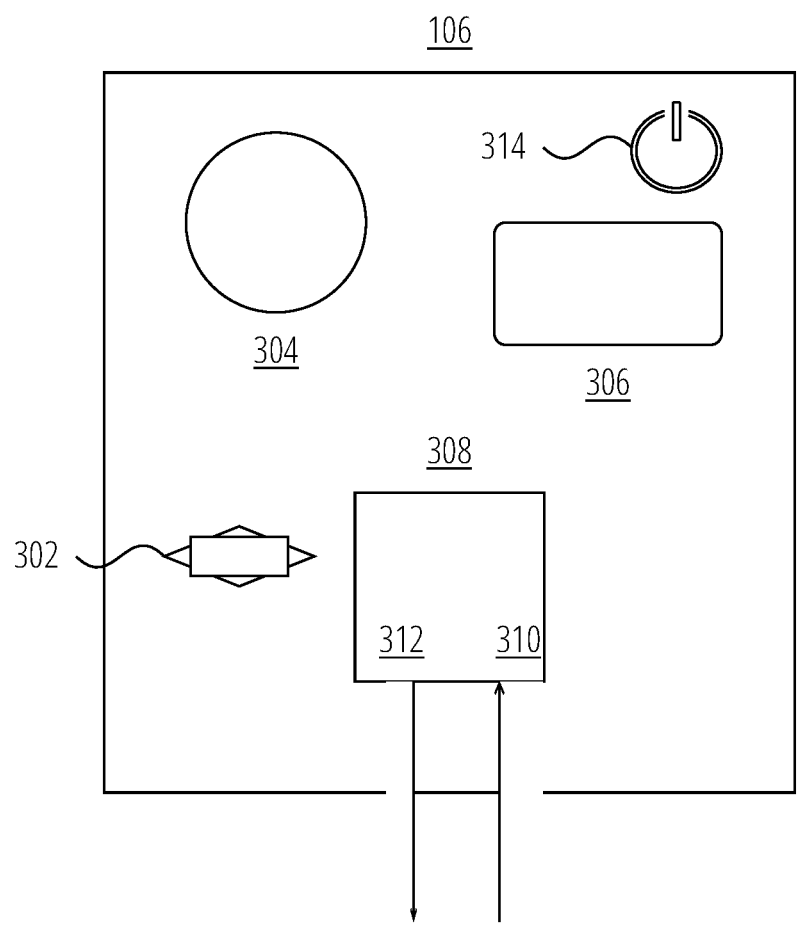
FIG. 3 illustrates one embodiment of the detection device.

FIG. 3 illustrates one embodiment of the detection device 106. The detection device 106 is powered by a detection battery 304 which can be replaceable or rechargeable. The detection battery 304 can be of the type that can be charged using electrical, magnetic or solar charger as well known in the art. The detection device 106 comprises a detection wireless communication 308 module which comprises a detection wireless receiver 310 and a detection wireless transmitter 312. The detection wireless communication 308 module can be of any type of short-range wireless protocol known in the art, such as bluetooth, RFID for examples.

The detection device 106 comprises a detection processor 306 to process the signals received by the detection wireless receiver 310 and to send signals via the detection wireless transmitter 312. The detection processor 306 periodically estimates the distance to the beacon device 108 and triggers a detection device alarm 302 to emit sound when the distance to the beacon device 108 exceeds a predetermined threshold. The distance can be estimated at a regular predetermined interval of time. In another embodiment, the interval of time between estimation can be changed as a function of the distance to the beacon device 108 increases. For example, as the beacon device 108 moves further from the detection device 106, the interval of time is reduced. In another embodiment, the interval of time is reduced based on the variation in the estimated distance, such that if the beacon device is moving away faster, the interval of time is reduced faster to ensure the detection of the threshold being exceeded is done in a timely manner.

The detection device 106 may have a detection on/off switch 314. The on/off switch may be any suitable type of switch, including a slide-type switch or a push-button type of switch. The beacon device 108 may also have a similar type of switch.

Figure 4:
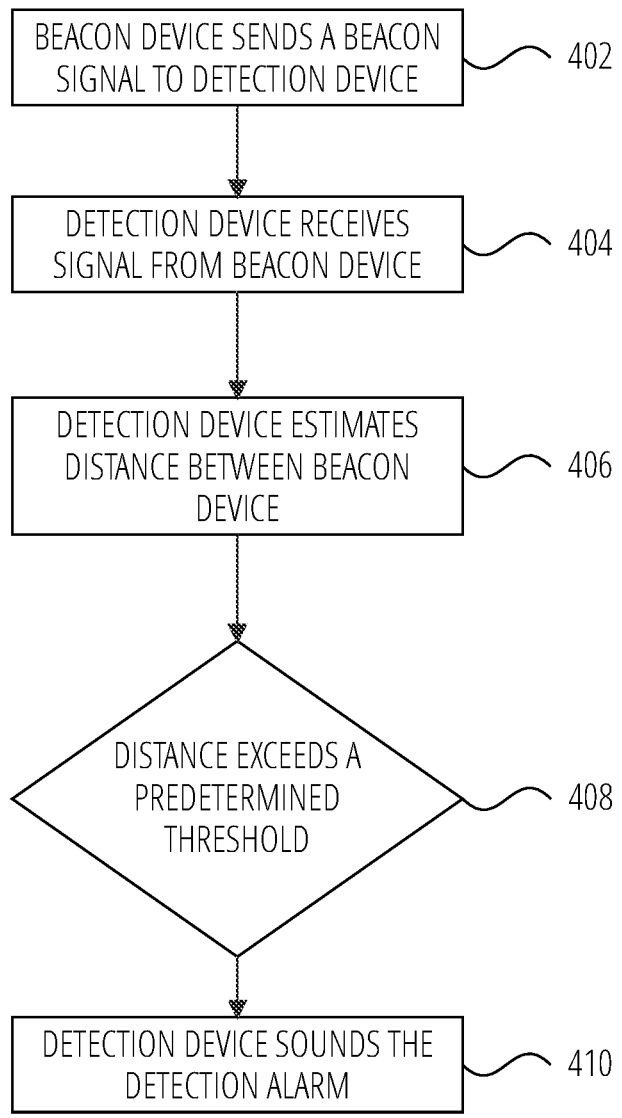
FIG. 4 illustrates one embodiment of the interactions between the beacon and detection devices.

FIG. 4 shows one embodiment of the system. In this embodiment, the beacon processor 206 on the beacon device 108 triggers the distance estimation. The beacon device sends a beacon signal to detection device 402 via the beacon wireless transmitter 212. When the detection device receives signal from beacon device 404, the detection device estimates distance between beacon device 406, if the distance exceeds a predetermined threshold 408, the detection device sounds the detection alarm 410. Optionally, the detection device 106 can send an alarm signal to the beacon device 108. When the beacon device 108 receive the alarm signal it triggers the beacon alarm 202.

The distance between the beacon device 108 and the detection device 106 can be estimated using any distance measurement algorithms known in the art, such as estimating the signal strength for example and estimating that the distance has increased when the signal strength is reduced.

The beacon processor 206 can trigger the distance estimation at regular or variable intervals as disclosed above.

If the detection device does not receive beacon signal from the beacon for a predetermined period of time, it optionally triggers a different alarm sound to indicate loss of communication. Optionally, if the detection device receives a weakened beacon signal from the beacon for a predetermined period of time, it optionally triggers a different alarm sound to indicate a soon-to-be loss of communication. This option may be utilized to indicate that a battery is losing power.

In another embodiment, the estimation of the distance reflects a relative distance such as the beacon device 108 being further or closer than the previous estimation. The alarm is triggered, when the relative distance exceeds a threshold.

Figure 5:
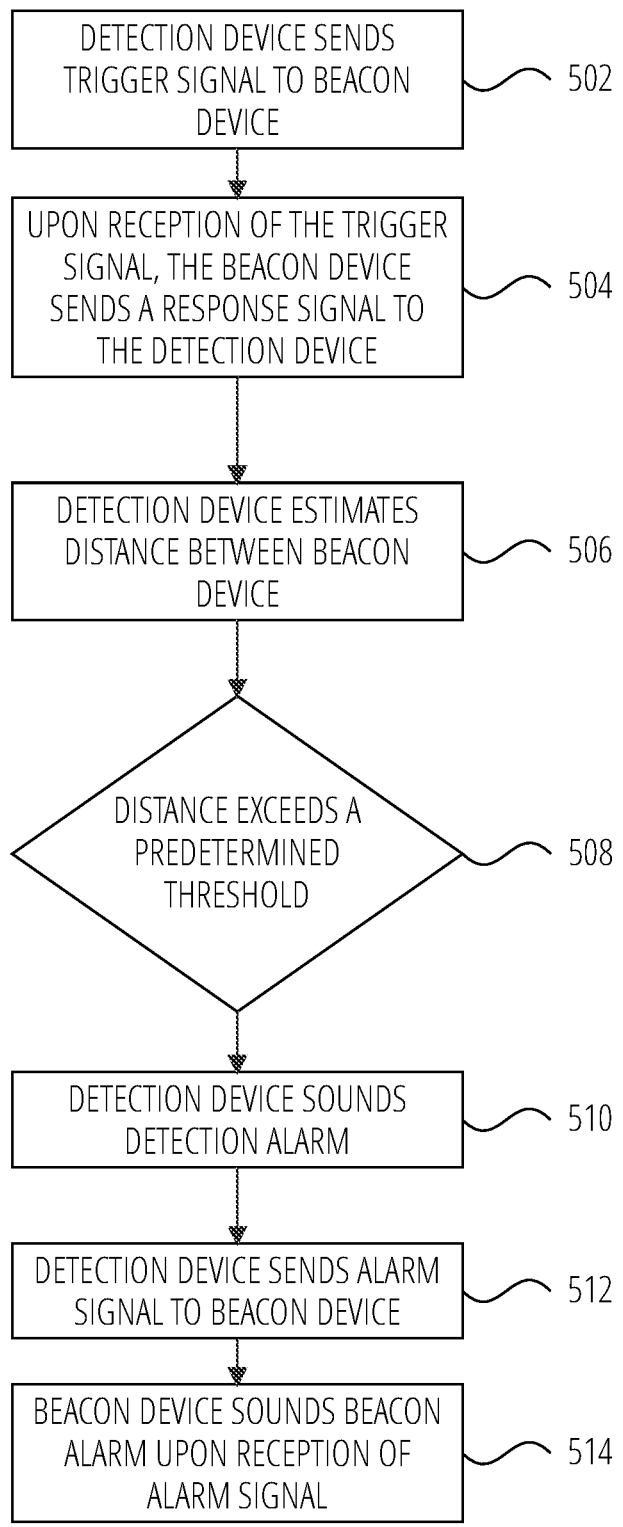
FIG. 5 illustrates another embodiment of the interactions between the beacon and detection devices.

FIG. 5 shows another embodiment of the system. In this embodiment, the detection device sends trigger signal to beacon device 502 upon reception of the trigger signal, the beacon device sends a response signal to the detection device 504, the detection device estimates distance between beacon device 506 and if the distance exceeds a predetermined threshold 508 the detection device sounds detection alarm 510. Optionally, the detection device sends alarm signal to beacon device 512 and the beacon device sounds beacon alarm upon reception of alarm signal 514.

In this embodiment, the distance can be estimated by having the detection processor 306 manage a timestamp and an associated unique identifier which is transmitted with the beacon signal. The beacon processor 206 includes the unique identifier with the response signal. When the detection processor 306 receives the response signal, it computes a round trip delay between the timestamp associated with the unique identifier and the time the response signal is received. The round trip delay is then used as an estimation of the distance between the beacon device 108 and the detection device 106. A variation in the round trip delay can optionally be used as the distance estimation.

If the detection device does not receive a response signal from the beacon it optionally triggers a different alarm sound to indicate loss of communication.

Optionally, the detection device 106 can send an alarm signal to the beacon device 108. When the beacon device 108 receive the alarm signal it triggers the beacon alarm 202.

The beacon processor 206 can trigger the distance estimation at regular or variable intervals as disclosed above.

Optionally further, when a beacon alarm 202 and/or a detection device alarm 302 has been triggered, a homing alarm feature may be engaged by the beacon device 108 and/or detection device 106. This feature will modify the alarm sound and/or visual alarm based on the distance between the two devices. For example, after an alarm has been triggered, as the detection device 106 is moved closer to the beacon device 108, the alarm sound may increase in volume and pitch. This modification may assist the user with locating the precious articles upon which the beacon device is attached in a more efficient and faster manner.

In some embodiments, the detection device 106 may include the functionality and capability of the beacon device 108, and the beacon device 108 may include the functionality and capability of the detection device 106. In these embodiments, the beacon device 108 and the detection device 106 may be simultaneously interchangeable.

In some embodiments, the predetermined threshold 408 may be selectable by the user. A selection slide or other similar component located on the detection device 106 and beacon device 108 may allow the user to select one of plurality of predetermined distances. For example, the user may set, or move, a selector switch located on the detection and beacon devices 106, 108 in order to select a predetermined distance of 5 meters, 10 meters or 20 meters as the distance to be used as the predetermined threshold 408.

In some embodiments, when there are three or more devices linked together, the alarm signal may be sent to all linked devices so that a detection alarm 410 and/or beacon alarm 202 may be triggered by all the linked devices. The alarms may be triggered for those linked devices that have not exceeded the predetermined threshold 408. For example, a first beacon device, a second beacon device and a detection device are linked. The first beacon device is moved beyond the predetermined threshold 408, while the second beacon device and the detection device remain within the predetermined threshold 408. An alarm signal may be sent to all three devices triggering an alarm from all three devices.

The exact specifications and materials used in the manufacture of the apparatus of the present invention may vary upon manufacturing.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment(s) were chosen and described in order to best explain the principles of the present invention and its practical application, to thereby enable others skilled in the art to best utilize the present invention and various embodiments with various modifications as are suited to the particular use contemplated.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment(s) were chosen and described in order to best explain the principles of the present invention and its practical application, to thereby enable others skilled in the art to best utilize the present invention and various embodiments with various modifications as are suited to the particular use contemplated.

I claim:

1. A system to protect from loss of one or more precious article owned by a user comprising:
   a beacon device coupled with each one of said one or more precious article;
   said beacon device in wireless communication with a detection device coupled with the user, the beacon device configured to send signals to the detection device, the detection device configured to receive the signals;
   the detection device further configured to estimate the distance between the beacon device and the detection device based on a predetermined interval of time between the signals received by the detection device,
   the detection device is further configured to trigger an alarm when the estimated distance exceeds a predetermined threshold, and
   that once the estimated distance exceeds the predetermined threshold, the detection device is further configured to reduce the predetermined interval to time.

2. The system of claim 1, wherein said wireless communication is using a Bluetooth communication system.

3. The system of claim 1, wherein said detection device is secured on a wristband worn by the user.

4. The system of claim 1, wherein said distance detection is achieved by having a trigger signal sent by the detection device to the beacon device and having the beacon device reply with a response signal.

5. The system of claim 1, wherein said distance detection is achieved by having a beacon signal sent by the beacon device to the detection device.

6. The system of claim 1, wherein said periodical estimation is done at equal intervals of time.

7. The system of claim 1, wherein said periodical estimation is done at an interval of time that varies based on the change in estimation of distance.

8. The system of claim 1 further comprising: triggering an alarm on the beacon device when said distance exceeds a predetermined threshold by sending an alarm signal from the detection device to the beacon device.

9. A system to protect from loss of one or more precious article comprising:
   a beacon device coupled with at least one of said one or more precious article;
   said beacon device in wireless communication with a detection device, the detection device is configured to send a trigger signal to the beacon device, the beacon device is configured to receive the trigger signal and to send a response signal to the detection device upon receipt of the trigger signal, the detection device is configured to receive the response signal;
   the detection device further configured to estimate the distance between the beacon device and the detection device based on a predetermined interval of time between the sending of the trigger signal and the receipt of the response signal,
   the detection device is further configured to trigger an alarm when the estimated distance exceeds a predetermined threshold, and
   that once the estimated distance exceeds the predetermined threshold, the detection device is further configured to reduce the predetermined interval to time.

10. The system of claim 9, wherein said wireless communication is using a Bluetooth communication system.

11. The system of claim 9, wherein said detection device is secured on a wristband worn by the user.

12. The system of claim 9, wherein said distance detection is achieved by having a trigger signal sent by the detection device to the beacon device and having the beacon device reply with a response signal.

13. The system of claim 9, wherein said distance detection is achieved by having a beacon signal sent by the beacon device to the detection device.

14. The system of claim 9, wherein said periodical estimation is done at equal intervals of time.

15. The system of claim 9, wherein said periodical estimation is done at an interval of time that varies based on the change in estimation of distance.

16. The system of claim 9 further comprising: triggering an alarm on the beacon device when said distance exceeds a predetermined threshold by sending an alarm signal from the detection device to the beacon device.

* * * * *